(12) United States Patent
Hussin et al.

(10) Patent No.: US 10,930,405 B2
(45) Date of Patent: Feb. 23, 2021

(54) MIXTURE FOR ANTI-RADIATION POZZOLON-POLYMERIC CEMENTITIOUS MATERIAL

(71) Applicants: The King Abdulaziz City for Science and Technology, Riyadh (SA); Universiti Malaysia Perlis, Kangar (MY)

(72) Inventors: Kamarudin Hussin, Kangar (MY); Mohd Mustafa Al Bakri Abdullah, Kangar (MY); Kahtan S Mohammed, Kangar (MY); Ali Basheer Azeez, Kangar (MY); Azmi Rahmat, Kangar (MY); Nik Noriman Zulkepli, Kangar (MY); Mohammed Binhussain, Riyadh (SA)

(73) Assignees: THE KING ABDULAZIZ CITY FOR SCIENCE AND TECHNOLOGY, Riyadh (SA); UNIVERSITI MALAYSIA PERLIS, Kangar (MY)

( * ) Notice: Subject to any disclaimer, the term of this patent is extended or adjusted under 35 U.S.C. 154(b) by 549 days.

(21) Appl. No.: 14/952,638

(22) Filed: Nov. 25, 2015

(65) Prior Publication Data

US 2016/0260510 A1    Sep. 8, 2016

(30) Foreign Application Priority Data

Mar. 3, 2015  (MY) .......................... PI 2015700660

(51) Int. Cl.
*G21F 1/04*   (2006.01)
*C04B 28/00*  (2006.01)
*C04B 111/00* (2006.01)

(52) U.S. Cl.
CPC ............ *G21F 1/042* (2013.01); *C04B 28/006* (2013.01); *C04B 2111/0031* (2013.01);
(Continued)

(58) Field of Classification Search
CPC ................... G21F 1/042; C04B 28/006; C04B 2111/00258; C04B 2111/0031; Y02W 30/92; Y02W 30/94; Y02P 40/165
See application file for complete search history.

(56) References Cited

U.S. PATENT DOCUMENTS 3,663,251 A * 5/1972 Moren ..................... C04B 28/04
                                                                  106/725
3,988,279 A * 10/1976 Klassen .................. C04B 28/04
                                                                  106/727

(Continued)

OTHER PUBLICATIONS

Benny Joseph and George Mathew, "Influence of aggregate content on the behavior of fly ash based geopolymer concrete" 2012 Scientia Iranica Transactions A: Civil Engineering 19 (5) 1188-1194 (Year: 2012).*

(Continued)

*Primary Examiner* — Andrew J. Oyer
(74) *Attorney, Agent, or Firm* — Dennemeyer & Associates, LLC; Steven M. Shape

(57) ABSTRACT

An anti-radiation concrete comprising a geopolymer is described. In an implementation, the anti-radiation concrete comprises a mixture of at least two aqueous alkaline activators, fine aggregate, and coarse aggregate from high density metal-containing rocks.

10 Claims, 2 Drawing Sheets

(52) U.S. Cl.
CPC ..... *C04B 2111/00258* (2013.01); *Y02P 40/10* (2015.11); *Y02W 30/91* (2015.05)

(56) References Cited

U.S. PATENT DOCUMENTS

| | | | |
|---|---|---|---|
| 9,890,082 B2* | 2/2018 | Dubey | C04B 12/005 |
| 2005/0103235 A1* | 5/2005 | Harrison | C04B 28/04 |
| | | | 106/801 |

OTHER PUBLICATIONS

Zainab Ismail and Enas AL-Hashmi "Reuse of waste iron as a partial replacement of sand in concrete" Waste Management 28 (2008) 2/48/2053, (Year: 2008).*

* cited by examiner

US 10,930,405 B2

MIXTURE FOR ANTI-RADIATION POZZOLON-POLYMERIC CEMENTITIOUS MATERIAL

TECHNICAL FIELD

This invention relates to a geopolymeric cementitious material. More particularly, the present invention relates to a heavy geopolymer-based concrete for shielding radiation which contains no ordinary Portland cement to minimize emission of carbon dioxide.

BACKGROUND

To shield a radiation source from which ionizing radiation is emitted, concrete is often used in facilities containing radioactive sources or radiation generating equipment. The selection of materials and the configuration of materials for shielding which result in different shielding properties are dependent on the type, intensity, and output of the radiation source. Ordinary Portland cement and highly dense aggregates are usually used to enhance the shielding properties of the concrete. However, such high concentration of ordinary Portland cement and dense aggregates present in the concrete contribute to the high energy demand to produce as huge carbon dioxide emission. It is estimated that 0.7 tons to 1.1 tons of carbon dioxide is emitted for every ton of concrete produced.

Research effort has been placed to develop a supplementary cementitious material for partial replacement of the ordinary Portland cement to encounter the aforementioned drawbacks. Geopolymer such as fly ash, blast furnace slag, silica fume, metakaolin, pozzolans, and biomass ash has been used as the supplementary cementitious material. Geopolymer are used because it is inert, strong, and environment friendly. There are few patented technologies over the prior art relating to geopolymer-based concrete. However, there is a wide variation in the compositions as well as the method of producing the same.

U.S. Pat. No. 8,257,486 discloses a building construction material made from ash, alkaline chemical activators, additive materials, and water in which ash constitutes the largest amount of the construction material. The ash can be fly ash or bottom ash whereas the additive materials can be metallurgical slag, building material debris, resins and plastics, clay, mining wastes, or a mixture thereof. The building material is formed through easy and simpler conditions by simply raw mixing, and is environmental friendly and cheap.

Another U.S. Pat. No. 8,323,398 discloses a construction material containing sand, fine aggregates, coarse aggregates, water, and a binder. The binder contains class F fly ash, blast furnace slag, alkaline activators, and a booster comprising at least one strong base. The patented invention also provides with a method of producing the construction material. The binder is mainly made from residues, thus is eco-friendly with limited indirect carbon dioxide emission and low energy consumption.

Chinese Patent No. 103224369 discloses an anti-radiation concrete produced from water, ordinary Portland cement, silicon ash, fly ash, high titanium heavy slag coarse aggregate, high titanium heavy slag sand, lead powder, methyl cellulose ether, and fibers. The concrete has good mechanical property, durability, and shielding performance which can be used in the fields of nuclear power, medical, scientific, or others.

Some of the cementitious construction material disclosed in the prior art contains no ordinary Portland cement with low energy consumption and carbon dioxide emission, however, the antiradiation capabilities of the construction material is low. On the other hand, construction material with anti-radiation properties disclosed in the prior art still relies on ordinary Portland cement as a base material. Hence, there is a need to develop a concrete composition with high radiation shielding capability and contains no ordinary Portland cement so as to minimize carbon dioxide emission and cost of production.

SUMMARY

One of the objects of the invention is to provide a heavy geopolymer-based concrete for shielding radiation. Another object of the invention is to provide a method of producing the heavy geopolymer-based concrete for shielding radiation. Still another object of the invention is to develop a geopolymer-based concrete for shielding radiation without the use of ordinary Portland cement. Yet another object of the invention is to develop a method of producing an anti-radiation concrete through simple mixing and curing steps which has minimum carbon dioxide emission and energy requirement. The concrete can be cured at a relatively low temperature due to the absence of ordinary Portland cement.

At least one of the preceding aspects is met, in whole or in part, by the present invention, in which the embodiment of the present invention describes an anti-radiation concrete comprising a geopolymer; a mixture of at least two aqueous alkaline activators; fine aggregate; and coarse aggregate from high density metal-containing rocks.

In a preferred embodiment of the invention, the geopolymer is fly ash, kaolin, pozzolonite, or a mixture thereof. In another preferred embodiment of the invention, the alkaline activators are hydroxides, silicates, sulfates, or carbonates of an alkali metal.

Still in another preferred embodiment of the invention, the fine aggregate is sand, waste iron, slag, or a mixture thereof. Yet in another preferred embodiment of the invention, the ratio of geopolymer to alkaline activator is 2 to 3.

A further embodiment of the invention is a method of producing an anti-radiation concrete as described in any of the preceding claims comprising the steps of mixing alkaline activators, geopolymer, fine aggregate, and coarse aggregate; curing the mixture in a mold at 70° C. for 24 hours; aging the cured mixture; and de-molding the aged mixture.

The preferred embodiment of the invention consists of novel features and a combination of parts hereinafter fully described and illustrated in the accompanying drawings and particularly pointed out in the appended claims; it being understood that various changes in the details may be effected by those skilled in the arts but without departing from the scope of the invention or sacrificing any of the advantages of the present invention.

DETAILED DESCRIPTION

This disclosure describes a geopolymeric cementitious material. More particularly, the present invention relates to a heavy geopolymer-based concrete for shielding radiation which contains no ordinary Portland cement to minimize emission of carbon dioxide.

Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

Figure 1:
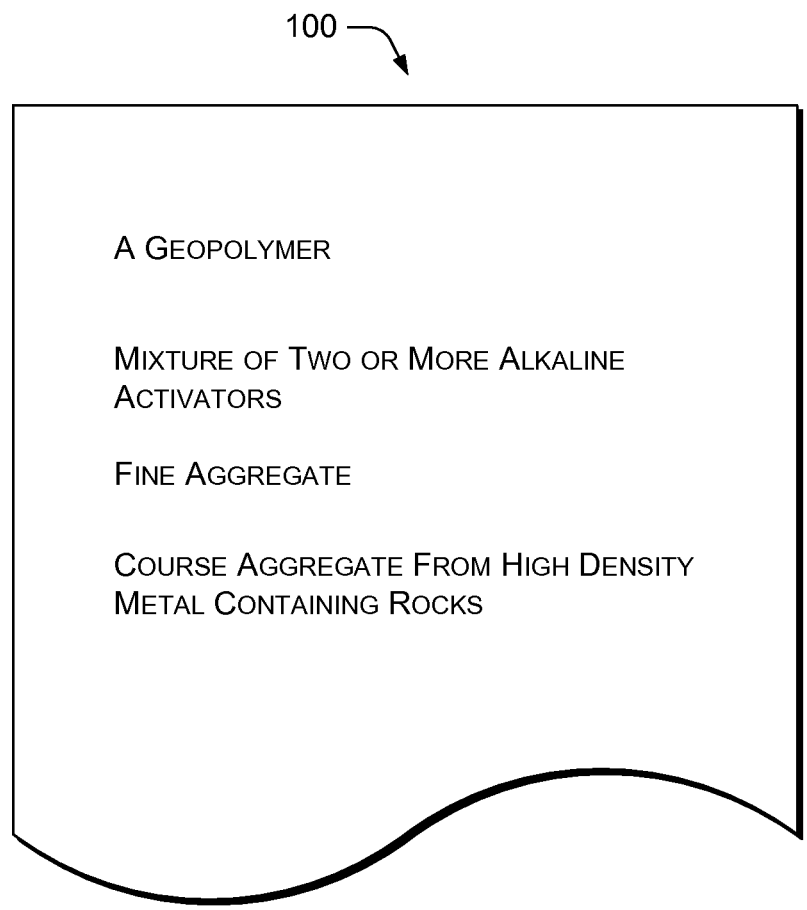
FIG. 1 is a diagram of an example list of anti-radiation concrete components.

In an implementation shown in FIG. 1, an anti-radiation concrete 100 comprises a geopolymer; a mixture of at least two aqueous alkaline activators; fine aggregate; and coarse aggregate from high density metal containing rocks.

In the preferred embodiment of the invention, the geopolymer-based concrete is formed from geopolymer as a base material and contains no ordinary Portland cement. The geopolymer can be selected from the group, but not limited to, consisting of kaolin, fly ash, pozzolonite, silica sand, or a mixture thereof. Preferably, ASTM Class F fly ash is employed. Class F fly ash is typically from the burning of harder, older anthracite and bituminous coal. Class F fly ash is pozzolanic in which the sum of silicon dioxide ($SiO_2$), aluminium oxide ($Al_2O_3$), and iron oxide ($Fe_2O_3$) is higher than 70%.

The geopolymer is preferably activated with at least two alkaline activators to improve the physical properties of the geopolymer. A mixture of at least two alkaline activators is more preferred. The alkaline activators can be selected from hydroxides, silicates, sulfates, or carbonates of an alkali metal. Preferably, the alkaline activators are sodium silicate ($Na_2SiO_3$) and sodium hydroxide (NaOH). Preferably, the concentration of the alkaline activators is 10M to 15M. However, a person skilled in the art shall aware that a mixture of two and more alkaline activators or any alkaline activator other than those which contain silicate and hydroxide groups is also feasible. Preferably, the weight ratio of solid geopolymer to liquid alkaline activators is 2.5. Likewise, the weight ratio of silicate activator to hydroxide activator is preferably 2.5. The solid to liquid weight ratio and the liquid to liquid weight ratio depend on the configuration of the final product.

According to the preferred embodiment of the invention, the anti-radiation concrete comprises both fine and coarse aggregates. Aggregates serve as a reinforcement to add strength to the overall composite concrete. They bind with the geopolymer along with water to form concrete with predictable and uniform properties. For a good concrete mix, aggregates need to be clean, hard, strong particles free of absorbed chemicals or coatings of clay and other fine materials that could cause the deterioration of concrete. Fine aggregate includes, but is not limited to, consisting of sand, waste iron, iron slag, or a mixture thereof. Preferably, sand is mainly used as the fine aggregate. However, waste iron which has been crushed, refined, and sieved to about 188 μm particle size can be mixed with sand to enhance the concrete density for better radiation shielding. Preferably, the weight ratio of sand to waste iron is 3. Other weight ratio of sand and waste iron such as 3:2 or 1:1 is also possible depending on the desired properties of the concrete.

In accordance to the preferred embodiment of the invention, coarse aggregate is preferably high density natural ore rocks. The ore rocks are crushed and sieved to obtain coarse aggregate of 4.5 mm to 9 mm particle size. Fine ore rocks that are able to pass through the sieve can be mixed with the fine aggregate. Preferably, the ore rocks are selected from, but not limited to, consisting of hematite, dolomite, cassiterite, or a combination thereof. A person skilled in the art shall aware that any other ore rocks that contain nonradioactive heavy weight metals can also be used.

One shall note that the particle size of the aggregates is subjected to variation depending on the desired concrete structure and density. Careful selection of different aggregate sizes enhances the close packing of the concrete structure and consequently improves densification.

As described by the preferred embodiment of the invention, the anti-radiation concrete comprises geopolymer, alkaline activators, fine aggregate, and coarse aggregate. Preferably, the antiradiation concrete comprises fly ash, NaOH, $NaSi_2O_3$, sand, waste iron, and crushed ore rocks. Advantageously, the composition of the anti-radiation concrete is 10%-20% geopolymer, 4%-8% alkaline activators, 15%-25% fine aggregate, and 50%-70% coarse aggregate.

Figure 2:
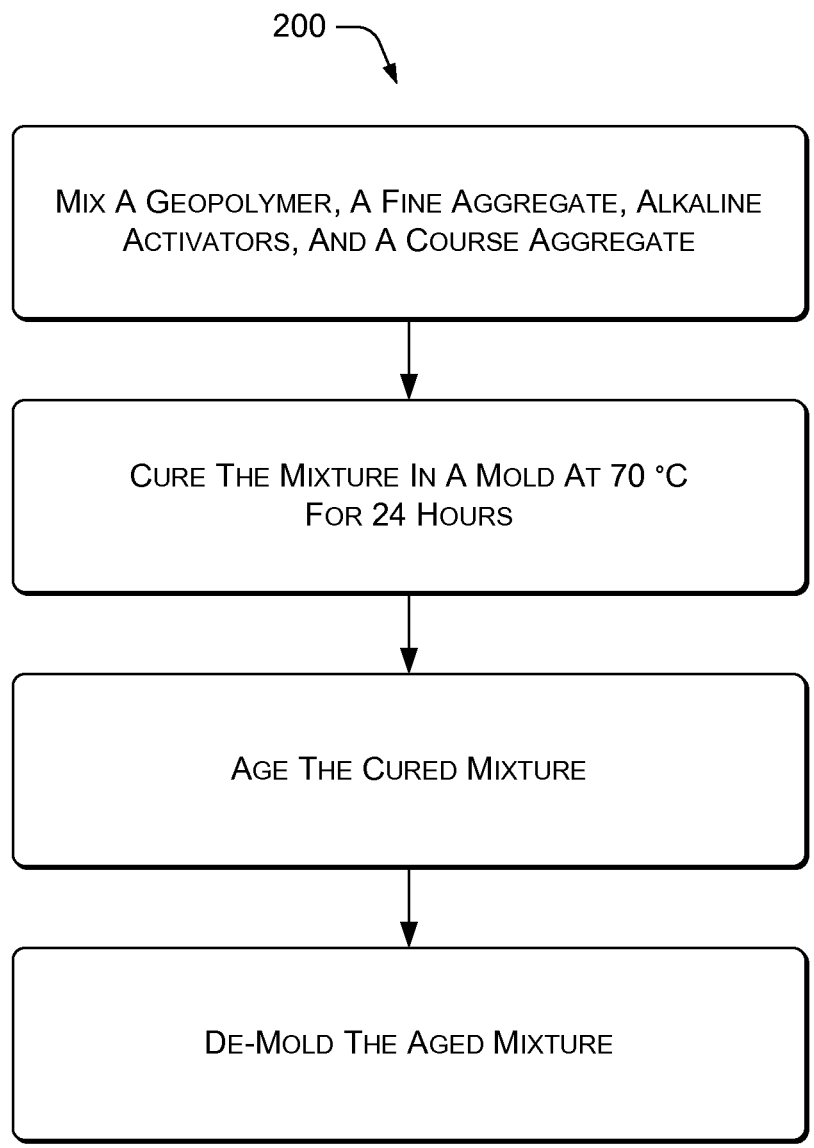
FIG. 2 is a flow diagram of an example method of making an anti-radiation concrete.

As shown in FIG. 2, a further embodiment of the invention is a method 200 of producing an anti-radiation concrete as described in any of the preceding descriptions comprising the steps of mixing alkaline activators, geopolymer, fine aggregate, and coarse aggregate; curing the mixture in a mold at 70° C. for 24 hours; aging the cured mixture; and de-molding the aged mixture.

Prior to mixing the required composition, a mixture of at least two alkaline activators is mixed at a predetermined ratio. The alkaline activators can be hydroxides, silicates, sulfates, or carbonates of an alkali metal. Preferably, the alkaline activators are sodium hydroxide and sodium silicate which are mixed at a weight ratio of 2.5. The geopolymer is then activator by the alkaline activators. The geopolymer can be kaolin, fly ash, pozzolonite, silica sand, or a mixture thereof. The alkaline activators mixture is gradually added to the geopolymer with agitation for a sufficient duration until a homogenours mixture is obtained. Preferably, the geopolymer is fly ash and the weight ratio of alkaline activators to geopolymer is 2.5.

In the further embodiment of the invention, the activated geopolymer is mixed homogeneously with fine and coarse aggregates with stirring. The fine and coarse aggregates are crushed and sieved to a desired particle size prior to mixing with the activated geopolymer. Fine aggregate may include sand, waste iron, iron slag, or a mixture thereof. Preferably, the fine aggregate is a mixture of sand and waste iron in a preferred weight ratio of 3:1. Other weight ratio of sand and waste iron such as 3:2 or 1:1 is also possible depending on the desired properties of the concrete.

Advantageously, the coarse aggregate is any heavy weight natural ore rock that is nonradioactive. Preferably, the ore rocks can be hematite, dolomite, cassiterite, or a combination thereof.

According to the further embodiment of the invention, the activated geopolymer/aggregates mixture comprises 10%-20% geopolymer, 4%-8% alkaline activators, 15%-25% fine aggregate, and 50%-70% coarse aggregate. The homogenous activated geopolymer/aggregates mixture is then inserted into a mold covered by a thin plastics layer to prevent water evaporation, following by curing at a temperature of 60° C.-80° C. for at least 24 hours. Preferably, the curing temperature and curing time is 70° C. and 24 hours respectively, in a low temperature electrical furnace.

Subsequently, the mold is left cool to room temperature and aged for at least 7 days at room temperature. The mold is kept covered by the thin plastics layer during aging. The anti-radiation concrete is obtained after de-molding for at least 28 days.

Although the invention has been described and illustrated in detail, it is to be understood that the same is by the way of illustration and example, and is not to be taken by way of limitation. The spirit and scope of the present invention are to be limited only by the terms of the appended claims.

EXAMPLE

The composition of the anti-radiation concrete according to one of the preferred embodiment of the invention is as shown in Table 1.

TABLE 1

| Fly Ash (g) | Alkaline Activators (g) | | Fine Aggregate (Sand + Waste Iron) (g) | Hematite Coarse Aggregate (g) |
| --- | --- | --- | --- | --- |
| | NaOH | NaSi$_2$O$_3$ | | |
| 625.77 | 71.52 | 178.79 | 800 | 2400 |

The compressive strength of the concrete produced with the composition as shown in Table 1 is determined using a mechanical testing machine as according to ASTM C 109/C 109 M standards. The compressive strength, density, porosity, water absorption, linear attenuation coefficient for both $_{137}$Cs and $_{60}$Co gamma ray sources of the produced concrete is as shown in Table 2.

TABLE 2

| Compressive Strengh | Porosity | Water Absorption | Density | Linear Attenuation Coefficient for two Gamma sources (cm$^{-1}$) | |
| --- | --- | --- | --- | --- | --- |
| (MPa) | (%) | (%) | (kg/m$^3$) | $^{137}$Cs | $^{60}$Co |
| 87.112 | 8.73 | 3.39 | 4189 | 0.201 ± 0.002 | 0.162 ± 0.003 |

The invention claimed is:

1. An anti-radiation concrete, comprising:
   a geopolymer;
   a mixture of at least two aqueous alkaline activators, wherein a weight ratio of the geopolymer to the at least two aqueous alkaline activators is 2:1 to 3:1;
   a fine aggregate comprising a sand and waste iron, wherein a weight ratio of the sand to the waste iron is 1:1 to 3:1; and
   a coarse aggregate of particles having a particle size of 4.5 millimeters to 8.0 millimeters and comprising hematite ore, dolomite ore, cassiterite ore, or any combination thereof.

2. The anti-radiation concrete according to claim 1, wherein the geopolymer is selected from the group consisting of a fly ash, a kaolin, a pozzolonite, or any combination thereof.

3. The anti-radiation concrete according to claim 1, wherein the at least two aqueous alkaline activators are selected from the group consisting of a hydroxide, a silicate, a sulfate, and a carbonate of an alkali metal.

4. The anti-radiation concrete according to claim 1, further comprising a curing agent selected from the group consisting of an amine, a polyamide resin, an imidazole, a polymercaptan, and an anhydride.

5. The anti-radiation concrete according to claim 1, comprising 10%-20% geopolymer, 4%-8% alkaline activators, 15%-25% fine aggregate, and 50%-70% coarse aggregate.

6. The anti-radiation concrete according to claim 1, wherein the anti-radiation concrete has a linear attenuation coefficient for a $_{137}$Cs gamma ray source of 0.201±0.002 cm$^{-1}$ and a linear attenuation coefficient for a $_{60}$Co gamma ray source of 0.162±0.003 cm$^{-1}$.

7. A method of producing an anti-radiation concrete, comprising:
   mixing a geopolymer, a fine aggregate comprising a sand and waste iron, wherein a weight ratio of the sand to the waste iron is 1:1 to 3:1, at least two alkaline activators, and a coarse aggregate of particles having a particle size of 4.5 millimeters to 8.0 millimeters and comprising hematite ore, dolomite ore, cassiterite ore, or any combination thereof, wherein a weight ratio of the geopolymer to the at least two alkaline activators is 2:1 to 3:1;
   curing the mixture in a mold at 70° C. for 24 hours;
   aging the cured mixture; and
   de-molding the aged mixture.

8. The method of claim 7, wherein the geopolymer is selected from the group consisting of a fly ash, a kaolin, a pozzolonite, or any combination thereof.

9. The method of claim 7, wherein the aqueous alkaline activators are selected from the group consisting of a hydroxide, a silicate, a sulfate, and a carbonate of an alkali metal.

10. The method of claim 7, further comprising curing with an agent selected from the group consisting of an amine, a polyamide resin, an imidazole, a polymercaptan, and an anhydride.

* * * * *